United States Patent [19]

Eckhoff

[11] 4,402,914

[45] Sep. 6, 1983

[54] APPARATUS FOR CONTINUOUS PRODUCTION OF EMULSIONS

[76] Inventor: Paul S. Eckhoff, Oyster Bay Cove, N.Y.

[21] Appl. No.: 282,252

[22] Filed: Jul. 10, 1981

[51] Int. Cl.³ .................... B01J 14/00; B01J 19/24
[52] U.S. Cl. .................... 422/132; 165/184; 366/144; 422/135; 422/138; 422/200
[58] Field of Search ............. 422/131, 132, 135, 138, 422/200, 202; 366/144; 165/154, 184; 138/38

[56] References Cited

U.S. PATENT DOCUMENTS

| | | | |
|---|---|---|---|
| 2,236,358 | 3/1941 | Allardice | 165/184 |
| 3,203,766 | 8/1965 | Madd et al. | 422/132 |
| 3,293,000 | 12/1966 | Marwil | 422/132 |
| 3,458,467 | 7/1969 | Herrle et al. | 422/138 |
| 3,595,846 | 7/1971 | Rouzier | 422/131 |
| 3,738,815 | 6/1973 | Pawloski et al. | 422/132 |
| 3,800,985 | 4/1974 | Grout et al. | 138/38 |
| 4,177,240 | 12/1979 | Bianco | 422/138 |

*Primary Examiner*—Michael S. Marcus
*Attorney, Agent, or Firm*—Eisenman, Allsopp & Strack

[57] ABSTRACT

A continuous throughput endless loop reactor for polymerizing monomers formed by a material conveying conduit connected in an endless loop having spaced apart raw material inlet means and polymer output means in which the output volume can be controlled by a pressure sensitive element and in which a coolant line passes internally through the conduit preferably becoming near the output means. Reaction speed as well as thermal control is augmented by helical vanes of alternately pitch sections joining the coolant line and the interior walls of the conduit.

2 Claims, 1 Drawing Figure

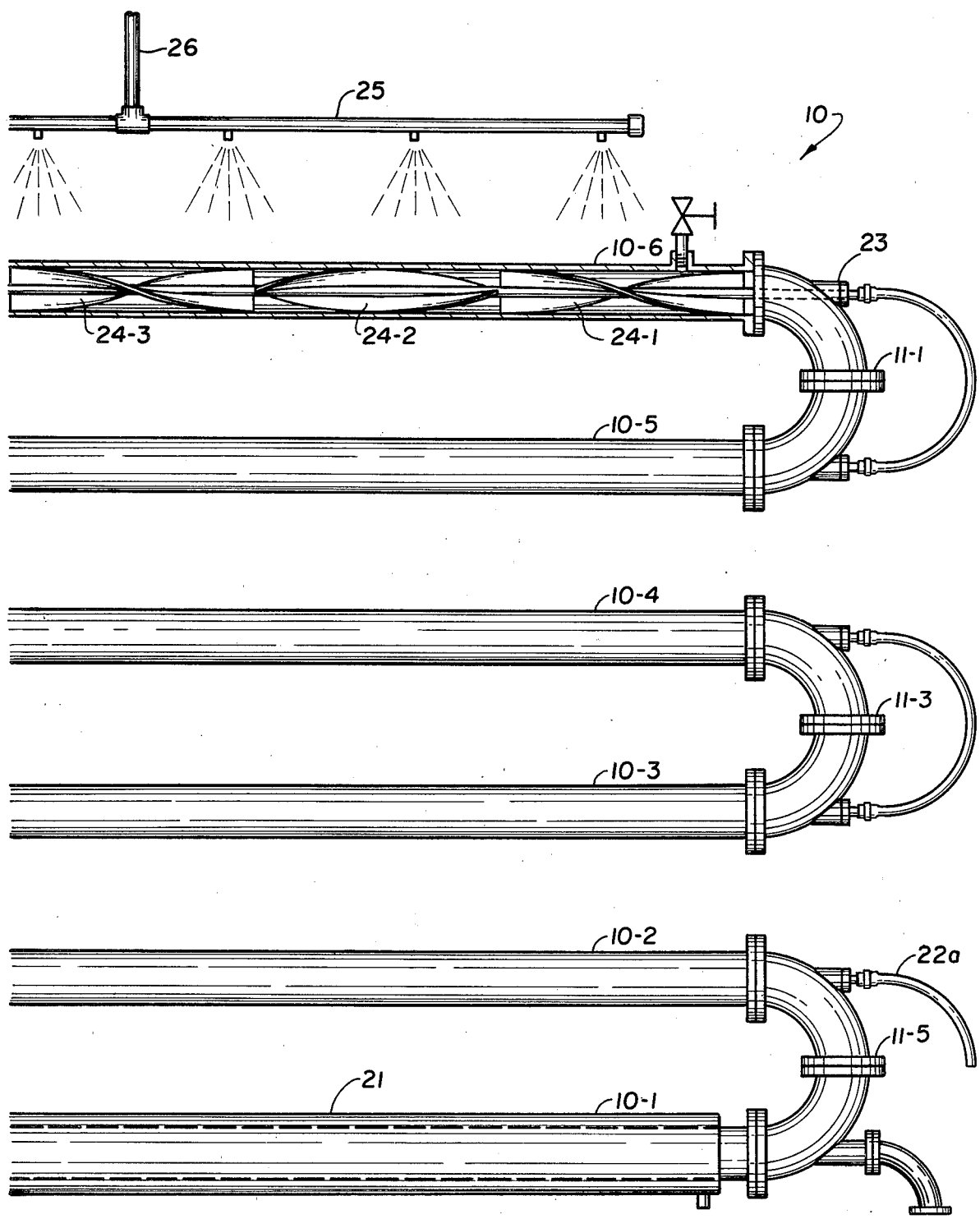

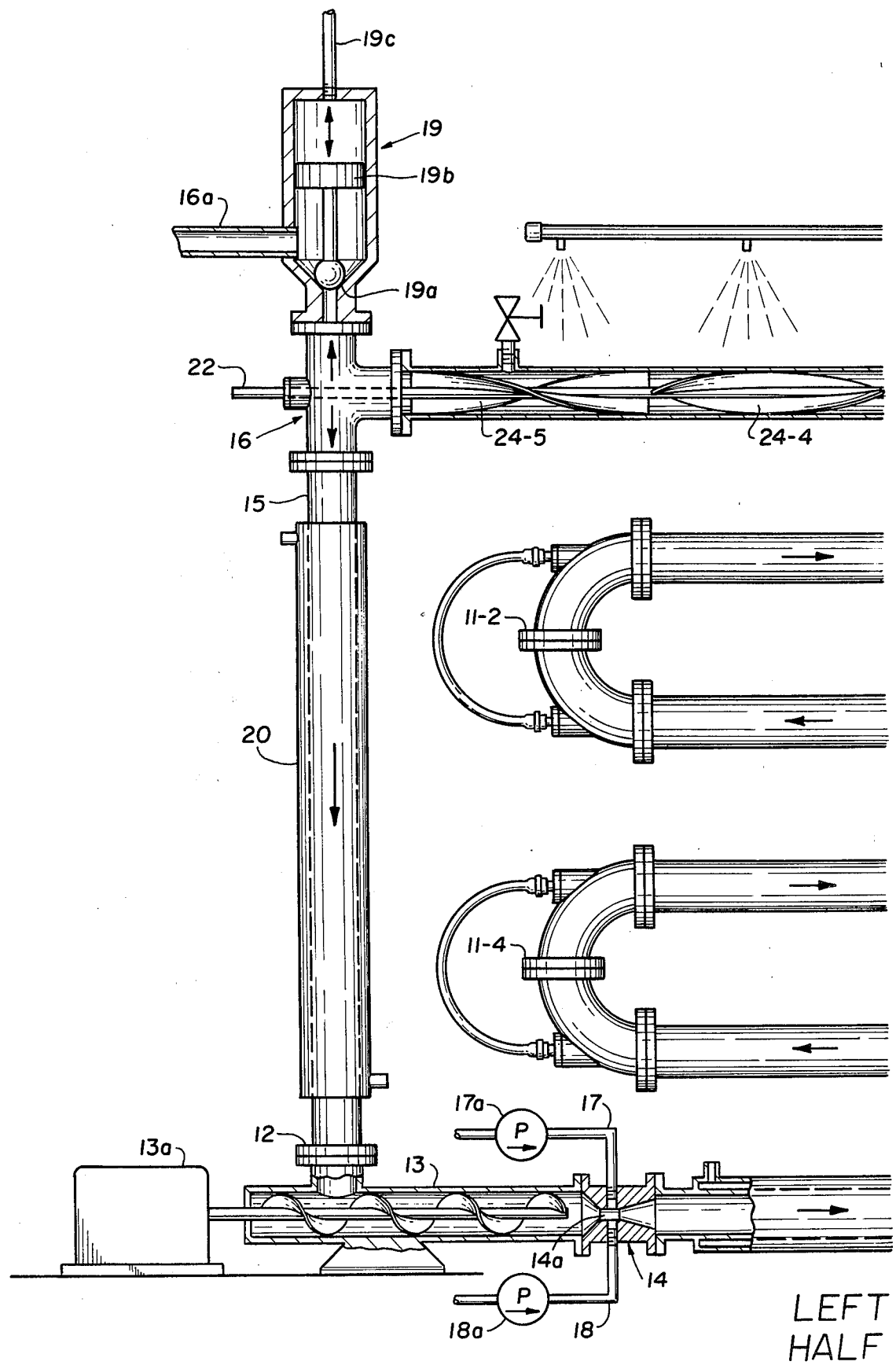

APPARATUS FOR CONTINUOUS PRODUCTION OF EMULSIONS

BACKGROUND OF THE INVENTION

This invention relates to reactors for polymerizing, in a continuous throughput polymerizable materials in a liquid medium. Processes have been evolved for the continuous polymerization of monomers, such for example as processes described in Canadian Pat. No. 1,220,777, overcoming the more costly cumbersome procedures involved in batch processing. Such improved processes have, however, been limited to relatively small throughputs due in particular to the problem of dissipating the heat of the exothermal reaction in sufficient quantity in a given time span for precision control of critical reactor temperatures.

SUMMARY OF THE INVENTION

The present invention has for its object to provide higher than normal throughput, using an apparatus in the form of a continuous throughput reactor for polymerizing materials in a liquid medium with faster heat exchange under precise control. In accordance with the invention, series conduits of substantial internal diameter are provided, preferably in a loop-coupled configuration in a vertical plane to conserve space and through which the polymerizable medium is passed at a controlled rate. The loop coupling provides for multiple cycling of the material through the completely filled conduit system and the output is drawn off through a controlled continuously variable pressure discharge, the volumetric rate of which is directly proportioned to the raw material inputs. The raw material inputs are arranged in a common input venturi through which the polymerized or partially polymerized medium within the closed loop is continuously passed at a controlled velocity. Each input such for example as that for the monomer and that for an aqueous-surfactant solution is itself maintained under positive pressure by individually controllable pumps. Thus the raw materials under pressure impinge on the previously polymerized material in the low pressure, high velocity throat of the venturi to effect a heterogeneous mixture of both more and less polymerized material.

Polymerization can be initiated near the input end for example by a hot water or steam jacket, and thereafter the heat or polymerization generated within the reactor is continuously dissipated by cooling apparatus in the form of a liquid coolant line preferably passing coaxially through the reactor conduits and/or water immersing conduit or water spray on outside of the conduit. The cooling action is augmented and at the same time the reacting medium within the conduit is stirred and mixed by a sequence of helical flights or vanes thermally coupled to the coolant line at their radially inward edges and to the inside diameter of the conduits at their outer edges. The pitch of the helix is reversed sequentially, such for example, as every two feet within the conduits to control the dynamics of the reacting medium and to afford better thermal coupling between the coolant liquid and the reacting liquid. In a preferred embodiment, the coolant is passed into the system near the discharge end for the polymerized material and withdrawn heated at one or more points upstream, thus countering the flow of the reacting material.

BRIEF DESCRIPTION OF THE DRAWINGS

The single FIGURE of the drawing shows partly in diagrammatic form a continuous throughput reactor portions of which are shown in cross section to reveal the internal parts.

DESCRIPTION OF THE PREFERRED EMBODIMENT

A complete reactor system for polymerizating materials, such for example in an aqueous medium is illustrated by the drawing and comprises a closed loop conduit system 10 having a substantial inside diameter, such for example, as 3 inches and preferably formed of metal such as stainless steel. The conduit system 10 includes in the illustrated embodiment 6 straight sections 10-1, 10-2 . . . 10-6, joined head to tail in series by means of five 180° end couplings 11-1, 11-2 . . . 11-5 which are detachable for cleaning. In a typical arrangement, a total length of approximately 54 feet of conduit was provided with each straight section being approximately 8 feet in length and the stack was disposed in a vertical plane. An input extension 12 including a screw feed pump 13 having a variable speed drive 13a and discharges into a metering input venturi 14 via the throat 14a. The conduit loop is closed by a shunt conduit (riser) 15 joining an output mechanism indicated generally by the numeral 16 and the input extension 12 adjacent the pump 13. Thus the pump cycles the reacting material continuously around the loop and at all times impells polymerized and partially polymerized material into the venturi. Raw materials such as monomers and aqueous solutions are introduced into the venturi flow at the throat via input lines 17 and 19 including positive pressure metering pumps 17a and 18a. The output mechanism 16 is coupled to a variable pressure unloader 19 comprising a valve 19a seated by a pneumatic piston 19b, the pressure and therefore resilient seating force which is controlled variably by a source 19c. The shunt conduit 15 and the first conduit section 10-1 include steam or hot water heating jackets 20 and 21, respectively, for temperature control and for effecting initial reaction of the raw polymerizable material.

Passing coaxially through the conduit system preferably beginning at the output end is a coolant line 22 the output end 22a of which ultimately emerges at the input end of the second conduit stage 10-2. To facilitate assembly, a series of fittings 23 are provided near each end of each of the half round conduit couplers 11-1 . . . 11-5 through which the coolant line successively emerges from and reenters into the conduit system. Secured along the length of the coolant line 22 within the straight limbs 10-1 . . . 10-6 of the reactor conduit are a sequence of helical flights or vanes which vanes 24-1, 24-2 . . . 24-5 are illustrated in the cut away section in the conduit 10-6, each of approximately 2 feet in length and which alternately reverse in pitch. The first conduit section 10-1 and the shunt section do not include the coolant tubing and vane assemblies. The reactor can be cooled by means of a cold water spray introduced from a spray header 25 fed by a cold water inlet 26.

In operation, a mixture of the monomer and aqueous solution is injected into the conduit system and the load is cycled around the closed loop which being heated to the reaction point by means of the heating jackets 21 and 22. The succession of reversely pitched helical vanes causes the mixture first to rotate in one direction and then the opposite direction and so on through the entire system. The reverse flow of coolant medium such as water at the input end of the cycle of the system will be at an elevated temperature because it will have passed through the majority of the reactor picking up heat as it goes. At the input end, however, relatively less heat has been developed by the exotherm reaction so that the temperature gradient of the coolant liquid will correspond to the thermal load of the reactor, that is, the maximum temperature differential will occur near output end where the maximum amount of heat will have been generated. The helical vanes conduct the heat radially inward to coolant, thus assuring substantially uniform temperature conditions.

Another method of operation of the system can be carried out in which approximately 55 gallons of finished polymer (prepared separately by some other process such as a batch process) is first poured into the loop at its highest point in order to fill it. The charge is then cycled around the closed loop by pump while being heated to reaction temperature by heating jackets 21 and 22. Then a mixture of monomers is injected by metering pump into the loop through the venturi entering at point 17 together with an aqueous mixture plus initiator entering by metering pump through point 18. Polymerization then commences; heating is stopped and as the exotherm proceeds, cooling begins.

The second method has an advantage of producing less foam at the initial stages. Once foam is produced it is hard to get rid of it and as polymerization proceeds it tends to inhibit cooling by acting as an insulator.

While the invention has been described above as having reference to one preferred embodiment, it will be understood that it can take other forms and arrangements within the scope of the invention. For example, different cooling vane patterns can be provided to accommodate the dynamics of any given mixture. Also, the relative size of the coolant line and the reactor conduit can be varied as required, as can the means of bending the system to accommodate cleaning, assembling and the like. Also, the coolant line while being shown as coupled in series can be constituted, if desired, of a plurality of parallel sections by providing input and output headers (not shown) at the left and righthand ends of the conduit. The invention should not, therefore, be regarded as limited except as defined in the following claims.

I claim:

1. A temperature controlled continuous throughput reactor for polymerizing monomers in an aqueous mixture comprising an elongated material conveying conduit for exothermal reactions connected in an endless loop, including a plurality of straight sections respectively joined head to tail by curved detachable end sections, raw material inlet means and polymer output means at spaced points in the loop including variable volume pressure sensitive discharge control means to vary the polymer output, a coolant line passing internally throughout at least a substantial portion of the conduit, vanes secured to the outside of the cooling line within the conduit to thermally couple the coolant medium to the material within the conduit, said vanes being helically disposed and periodically reversed along the length of the conduit to induce rotation of the mixture flowing in the conduit, input feed and recirculating pump means in the loop, a shunt line connecting a section of the conduit which is remote from the inlet means back to a point near the input means and means operable independently of the coolant line to impart supplemental heat to the reactor.

2. Apparatus as set forth in claim 1 including supplemental cooling means for the outside of the conduit.

* * * * *